US012590475B2

(12) United States Patent
Pettengill et al.

(10) Patent No.: US 12,590,475 B2
(45) Date of Patent: Mar. 31, 2026

(54) MOTOR VEHICLE LOCK, IN PARTICULAR A MOTOR VEHICLE DOOR LOCK

(71) Applicant: Kiekert AG, Heiligenhaus (DE)

(72) Inventors: Robert S. Pettengill, Farmington, MI (US); Robert J. Hunt, Davisburg, MI (US)

(73) Assignee: Kiekert AG, Heiligenhaus (DE)

( * ) Notice: Subject to any disclaimer, the term of this patent is extended or adjusted under 35 U.S.C. 154(b) by 130 days.

(21) Appl. No.: 18/636,436

(22) Filed: Apr. 16, 2024

(65) Prior Publication Data

US 2025/0320755 A1 Oct. 16, 2025

(51) Int. Cl.
*E05B 81/04* (2014.01)
*E05B 81/14* (2014.01)

(52) U.S. Cl.
CPC .............. *E05B 81/14* (2013.01); *E05B 81/04* (2013.01)

(58) Field of Classification Search
CPC .......... E05B 81/14; E05B 81/04; E05B 81/01; E05B 81/16; E05B 81/20; E05B 77/32
See application file for complete search history.

(56) References Cited

U.S. PATENT DOCUMENTS

| | | | | |
|---|---|---|---|---|
| 6,471,259 B1 * | 10/2002 | Weyerstall | E05B 81/14 292/216 |
| 11,536,059 B2 * | 12/2022 | Rosales | E05B 81/14 |
| 2011/0187129 A1 * | 8/2011 | Graute | E05B 81/21 292/2 |

FOREIGN PATENT DOCUMENTS

| | | |
|---|---|---|
| DE | 102004056152 A1 | 6/2006 |
| DE | 102008015089 A1 | 10/2008 |
| DE | 202012010338 U1 | 2/2014 |
| DE | 102021100462 A1 | 7/2021 |
| EP | 2326779 B1 | 6/2011 |

* cited by examiner

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle lock comprising a locking mechanism having substantially a rotary latch and pawl as locking mechanism components, further comprising a closing device having at least one drive and a lever chain actuated thereby, and having a drive pawl following the lever chain for driving an associated locking mechanism component, wherein a means for interrupting the drive from the locking mechanism component is provided, and wherein the means for separation can be provided by a locking mechanism component.

16 Claims, 2 Drawing Sheets

MOTOR VEHICLE LOCK, IN PARTICULAR A MOTOR VEHICLE DOOR LOCK

FIELD OF DISCLOSURE

The invention relates to a motor vehicle lock, in particular a motor vehicle door lock, comprising a locking mechanism with substantially a rotary latch and pawl as locking mechanism components, a closing and opening device with at least one drive and a lever chain actuated thereby, and with a drive pawl following the lever chain for driving an associated locking mechanism component, wherein a means for separating the drive from the locking mechanism component is provided.

BACKGROUND OF DISCLOSURE

In order to increase the comfort in a motor vehicle and to make it as easy as possible to operate a motor vehicle, more and more comfort functions are being integrated into the motor vehicle. For example, it is known that motor vehicle doors, hatches or hoods are closed by means of a closing device. On the one hand, this can be due to the fact that easy closing of the door is to be made possible and, on the other hand, an outer door handle can be dispensed with, for example, in order to achieve a corresponding design on the motor vehicle. Such closing devices are often used, particularly in fully automatic tailgates. These hatches can then be operated, for instance, without manual operation of the hatch itself, merely by means of a radio remote control.

Such locking systems, which are equipped with a closing device, are in principle used for all possible doors in a motor vehicle. This means that not only side doors, but also trunk doors, tailgates or engine hoods can be acted upon and are included in the scope of the invention. With the aid of the closing device implemented in this way, the door concerned can be moved from a pre-latching position to a main latching position against the resistance of a seal.

The design of a closing device is the subject matter of DE 20 2008 015 089 A1. Provided herein is a transmission lever mounted on the same axis as an axis of a rotary latch of the locking mechanism. In addition, a drive pawl is mounted on a transmission lever. The drive pawl is in turn connected to the drive by means of a Bowden cable or another means of connection.

DE 10 2021 100 462 A1 discloses a motor vehicle lock with a locking mechanism consisting basically of a rotary latch and a pawl as locking mechanism components, furthermore a closing and opening device with at least one drive and a lever chain actuated thereby. The lever chain interacts with a drive pawl for driving the associated locking mechanism component. In order to be able to interrupt the closing process in the event of becoming jammed in the door, for example, the document proposes interrupting the closing or opening process. In order to interrupt the closing process, the motor vehicle lock is equipped with a disconnection point which can undo the engagement of the drive pawl with the locking mechanism component.

In principle, it is sometimes necessary to interrupt an opening movement by means of an opening device when the locking mechanism is actuated. In this case, the opening device does not act on the rotary latch via the drive unit and the thereby actuated lever chain and the drive pawl following the lever chain, but rather on the pawl, and ensures during an opening process that the pawl is lifted from its engagement with the rotary latch when the locking mechanism is in a closed state. As a result of this, the rotary latch can open with the assistance of a spring and can release a previously captive locking bolt. If such an opening movement is interrupted, this can be done again by the drive pawl being lifted from its engagement with the pawl in the example. However, with closing devices and a corresponding closing process, the problem routinely arises of being able to realize an emergency interruption.

With the aid of such closing devices, the relevant tailgate or motor vehicle side door is transferred from the pre-closed position, which is brought about manually, into a main closed position or main latching position with the aid of the drive. If, for example, clothing or, worse still, fingers of an operator become jammed in the door gap during this process, a type of emergency opening is required, or the associated closing operation must be interrupted. In the event of such an emergency interruption, the procedure is generally such that the drive pawl for driving the associated locking component is immediately lifted from its engagement with the rotary latch in the event of the closing movement already described above.

The prior art mentioned above has basically proven itself in this area. However, ejection of the drive pawl in the course of an emergency interruption sometimes requires complex mechanics, because the drive pawl is naturally arranged in the region of the rotary latch in order to be actuated. Often, only limited installation space is available for separating the drive pawl from the previously actuated rotary latch faultlessly, quickly, and directly, in particular for an emergency interruption, with the aid of the ejector lever. The invention starts at this point.

SUMMARY OF DISCLOSURE

The invention is based on the technical problem of further developing such a motor vehicle lock and in particular a motor vehicle door lock in such a way that the possibility for realizing a flexible interruption can be implemented with as little technical means as possible.

The object of the invention is to provide an improved motor vehicle lock with a closing device. Furthermore, it is the object of the invention to provide the comfort function in a minimum installation space with the smallest possible number of components.

According to the invention, the object is achieved by the features of independent claim 1. Advantageous embodiments of the invention are specified in the dependent claims. It should be noted that the embodiments described below are not restrictive; rather, any variation of the features described in the description and the dependent claims is possible.

According to claim 1, the object of the invention is achieved in that a motor vehicle lock is provided, comprising a locking mechanism with substantially a rotary latch and pawl as locking mechanism components, a closing and opening device with at least one drive and a lever chain actuated thereby, and a drive pawl following the lever chain for driving an associated locking mechanism component, wherein a means for interrupting the drive is provided, and wherein the means for separation can be provided by a locking mechanism component. The design of the motor vehicle lock according to the invention now makes it possible to provide a closing and opening device with a minimum number of components in the motor vehicle lock and thus with a reduced installation space. If the locking mechanism components themselves are used to interrupt or disconnect the closing operation, a closing and opening operation can be realized with a minimum number of components. Here, the pawl preferably serves as a separating means, wherein a movement of the pawl results in the drive pawl being moved out of engagement from the rotary latch. Thus, on the one hand, the pawl is moved out of the movement region of the rotary latch and, on the other hand, the drive pawl is separated from the rotary latch. Hence, the rotary latch is capable of being moved into the open position by its inherent spring pre-tension, so that a lock holder in engagement with the rotary latch can be released.

According to the invention, when referring to a motor vehicle latch, synonyms such as locking device, lock or door lock are synonymous with each other. The term "motor vehicle lock" also includes locks that are used in doors, sliding doors, hatches and/or covers in motor vehicles, i.e., wherever components that can be pivoted or moved on the vehicle must be held securely in position. A preferred feature of the motor vehicle lock according to the invention relates to a side door. Motor vehicle locks of this type comprise a locking mechanism consisting of a rotary latch and a pawl.

The locking mechanism can also be equipped with two or more pawls or, for example, have a detent or blocking lever. Such pawls are known from the prior art. In this case, the pawl engages directly with the catch and the locking or blocking lever secures the position of the pawl in the latching position, preferably the main ratchet position. In recent developments, locking parts mounted in the rotary latch are also used, which on the one hand are referred to as latching elements, and which, on the other hand, enable easier and more quiet opening of the locking mechanism.

A drive which is spaced apart from the motor vehicle lock and also a drive arranged on or in the motor vehicle lock can be used as a drive for the closing process. In external electrical drives, which can also be equipped with a transmission, a Bowden cable unit can be used for force transmission and then interacts with the lever chain in the motor vehicle lock. However, it is also conceivable for an electrical drive arranged on or in the motor vehicle lock to act on the lever chain directly, or to act on the lever chain by means of a gearbox. In any case, the electric drive provides the force or the torque for closing the locking mechanism. As already explained above, the closing causes the locking mechanism to be transferred from a pre-latching position into a main latching position. The pre-latching position is usually initiated manually by, for example, closing a side door. The motor vehicle lock is then still in an open position by a door gap being present, but with the door no longer being able to be opened. From this pre-latching position, the door is transferred into a main latching position or closed position, in which the door is then completely closed and ready for operation.

In a development of the invention, the drive pawl can be directly engaged with the rotary latch. In the non-actuated state of the closing device, the drive pawl is disengaged from the locking mechanism components. Only after activation of the closing device is the drive pawl pivoted toward the rotary latch and engages with the rotary latch. In other words, the locking mechanism is first moved, for example, manually into a pre-latching position, wherein the operator manually closes a tailgate or a sliding door or a side door, and then the locking mechanism is transferred from the pre-latching position into the main latching position. In the pre-latching position, the drive pawl is in the motor vehicle lock at a distance from an engagement surface on the rotary latch. If, for example, the pre-latching position is detected by means of a sensor, for example a microswitch, the drive for the closing device receives a signal, and the drive pawl is actuated. Only when the drive pawl is actuated does the drive pawl come into engagement with an engagement surface on the rotary latch. The closing drive can then transfer the locking mechanism from the pre-latching into the main latching position. A direct engagement of the drive pawl with the rotary latch leads to a direct transmission of force between the drive pawl and the rotary latch, so that closing with the smallest possible number of components can be realized.

Continuing with the invention, an actuating lever of the lever chain can be mounted on a locking mechanism part shaft. For further reducing the required components, the actuating lever can be mounted directly on a locking mechanism part shaft, preferably the pawl shaft. The locking mechanism part shafts are accommodated in a lock case or lock plate of the motor vehicle lock and consist of a steel material, so that a sufficiently stable mounting can be provided on the one hand for the locking mechanism, and on the other hand for the closing drive. The actuating lever is pivotably mounted on the locking mechanism part shaft and carries the drive pawl. For this purpose, the drive pawl is pivotably mounted on the actuating lever. In turn, the number of required components for realizing a closing drive can be effected as a result of the actuating lever being mounted directly on the locking mechanism part shaft. The actuating lever can interact directly with the electrical drive and/or a Bowden cable and/or a Bowden cable mount. Hence, the actuating lever can constitute a transmission stage for the closing device. By adapting the lever ratios, the closing device can be configurable so that different locking systems can be equipped with the design of the closing device according to the invention. In particular, the closing device is designed to be adaptable to the required closing forces.

It can also be advantageous, and can constitute a further embodiment of the invention, if the drive pawl can be pre-tensioned, in particular pre-tensioned in the direction of the rotary latch, by means of a spring element acting between the drive pawl and the actuating lever. By using a spring element, preferably a leg spring, a positioning of the drive pawl can be provided with the simplest design means. The leg spring ensures that, when the actuating lever is actuated, the drive pawl comes into engagement with the rotary latch. The drive pawl is spring-tensioned in the direction of the rotary latch. Only when the actuating lever is actuated does the drive pawl come into engagement with the rotary latch, so that a transition into the main latching position is enabled. This results in a structurally simple design of the closing device. If, for example, the actuating lever is actuated via a Bowden cable mount arranged, for example, pivotably on the actuating lever, the actuating lever pivots about the pawl shaft and moves the drive pawl to close. The free legs of the leg spring, for example, can be hooked into the actuating lever and the drive pawl. For example, a swivel shaft of the drive pawl can be used for mounting the leg spring, so that a positioning of the drive pawl can again be realized with minimal design effort.

Continuing with the invention, the drive pawl can be brought into engagement with a housing of the motor vehicle lock. Here, a significant advantage of the construction of the motor vehicle lock according to the invention becomes apparent. The motor vehicle lock housing is used to guide the drive pawl. The housing of the motor vehicle lock is preferably made of plastic and can serve for mounting, for protecting and for accommodating further lock components. The lock housing can also accommodate, for example, conductor tracks and/or sensor elements, such as a microswitch, as an electrical component carrier. The lock housing is part of the motor vehicle lock, wherein a new function can be assigned to the motor vehicle lock housing in the sense according to the invention. The motor vehicle lock housing fulfills not only the usual known tasks in the motor vehicle lock, but in this case the motor vehicle lock has a guide function for the closing device. The motor vehicle lock housing thus becomes part of the closing device. If the drive pawl is moved into the starting position by the actuating lever or by the electrical drive of the actuating lever, i.e., the drive pawl is disengaged from the rotary latch, the drive pawl comes into engagement with the housing on one side. Engagement with the lock housing is such that the drive pawl is moved away from the locking mechanism component against the spring force of the drive pawl. Hence, by the interaction of the movement of the drive pawl and engagement with the lock housing, the function of disengaging the drive pawl can be realized.

The drive pawl can advantageously be guided, at least in regions, by means of the housing, in particular can be guided toward the rotary latch. The housing thus forms a control contour for the drive pawl in that, in cooperation with the leg spring acting on the drive pawl, direct guiding of the drive pawl from the starting position into the actuating position can be carried out. Starting from the starting position in which the drive pawl, as already described above, the drive pawl is moved toward the engaged position when the actuating lever is actuated and guided along the housing of the motor vehicle lock. By actuating the actuating lever, the drive pawl is hence moved into the movement region of the rotary latch and, in particular, into an engagement surface of the rotary latch. Hence, guiding of the drive pawl and thus a safe functionality of the closing device can be provided with the simplest design means.

The drive pawl can advantageously be brought into engagement with a bolt arranged on the rotary latch. Starting from the starting position of the drive pawl, in which the drive pawl moves away from the engagement surface of the rotary latch, the drive pawl is moved into an engaged position or engagement position by the interaction of leg spring and lock housing. In the engagement position, the drive pawl comes into engagement, according to the invention, with a bolt arranged on the rotary latch. The bolt can be connected to a metallic core of the rotary latch for example by means of cold forming, preferably riveting. The bolt is preferably arranged on a radially outer radius of the rotary latch, so that a favorable transmission ratio can be realized in the closing drive. Starting from, for example, a Bowden cable, force transmission is transmitted to the drive pawl via the lever chain, Bowden cable mount, and actuating lever. By means of a radially outer arrangement of the bolt on the rotary latch, a further advantageous transmission ratio can be realized in order to achieve the highest possible closing force.

If, in the event of jamming or abortion of the closing operation caused for example by the operator, the drive pawl has to be released from the bolt during closing, the motor vehicle lock designed according to the invention provides a means for separating the engagement between the drive pawl and the bolt, wherein the separating means can be arranged on the pawl. Again, it shows that a simple separating device to be implemented with the smallest possible number of components can be realized with the present means arranged in the motor vehicle. The mechanism for unlocking the locking mechanism is used to realize a separating means for interrupting the closing operation. If a signal is generated during the closing operation, which signal results in the closing operation being interrupted or terminated, the pawl is actuated and the pawl interrupts the closing operation. Hence, with the components present in the motor vehicle lock it is possible to interrupt closing and thus to provide a safety function. The closing operation is interrupted, for example, when a force which goes beyond the usual closing operation is detected at the closing drive, so that jamming can be detected. In this case, on the one hand, the closing operation is stopped via a higher-level controller and, on the other hand, the pawl is actuated and the drive pawl disengaged from the rotary latch. At the same time, this offers the advantage that the rotary latch becomes completely free and the movable component can be released from engagement with a lock holder. In this case, the rotary latch can be freely pivoted so that the component arranged pivotably on the motor vehicle is freely movable.

If the drive pawl can be disengaged from the rotary latch by means of a movement of the pawl, wherein an engagement contour on the pawl comes into engagement with the drive pawl, an advantageous embodiment variant of the invention can be achieved. The drive pawl is preferably arranged in a plane in the motor vehicle lock, which plane is parallel to the rotary latch. The bolt extends beyond the locking mechanism part plane, so that the drive pawl can be brought into engagement with the bolt. Now, if an engagement contour is also formed in the direction of the bolt on the rotary latch in the direction of the drive pawl, the drive pawl can be pivoted by an interaction of the engagement contour and the drive pawl. The drive pawl preferably no longer rests against the housing of the motor vehicle lock during the closing operation, so that free pivoting of the drive pawl can be enabled by means of the pawl. Hence, the closing device can be realized with all functions due to the components present in the motor vehicle lock and the lever chain in the motor vehicle lock.

For further stabilization, it may be advantageous according to the invention if at least the pawl shaft and the rotary latch shaft can be stabilized by means of a reinforcing plate. On the one hand, the locking mechanism can be supported by the reinforcing plate and, on the other hand, additional stabilization of the actuating lever or lever chain can be achieved. The reinforcing plate is preferably formed from a metallic material and supports the locking mechanism part shafts in combination with the lock plate or a lock case.

BRIEF DESCRIPTION OF DRAWINGS

The invention is explained in more detail below with reference to the accompanying drawings. However, the principle applies that the embodiment does not limit the invention, but is merely an advantageous embodiment. The features shown can be implemented individually or in combination with further features of the description as well as the claims-individually or in combination.

In the figures.

DETAILED DESCRIPTION

Figure 1:
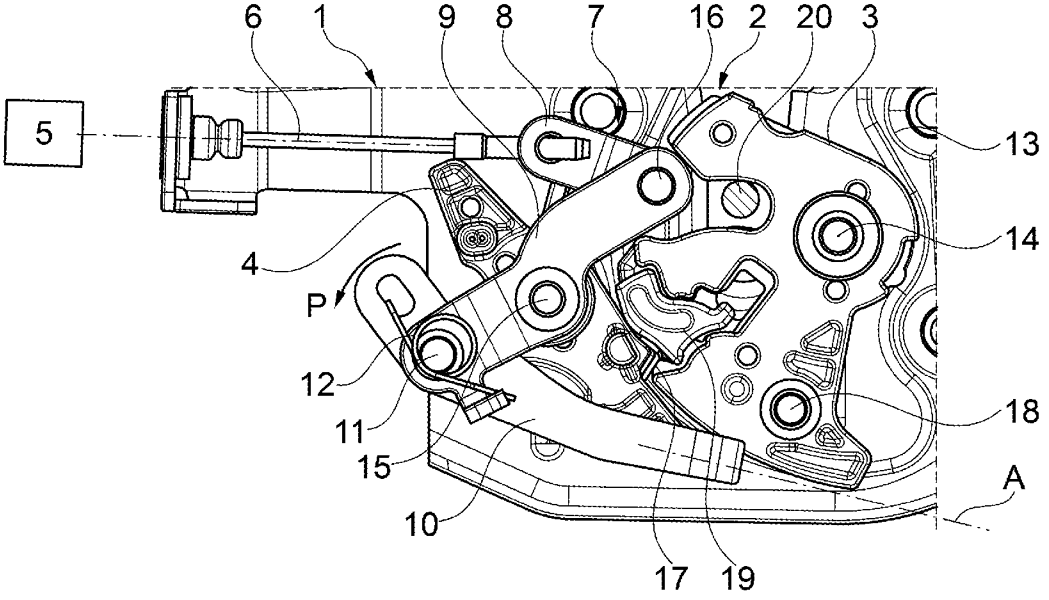
FIG. 1 shows a view of an open motor vehicle lock having a closing device designed according to the invention, wherein a pre-latching position of the locking mechanism is depicted.

FIG. 1 shows a motor vehicle lock 1 according to the invention in a plan view of an open motor vehicle lock 1 depicted in parts. Only the components of the motor vehicle lock 1 necessary to explain the invention are shown. The motor vehicle lock 1 comprises a locking mechanism 2 consisting of a rotary latch 3 and pawl 4. A Bowden cable 6, which acts on a lever chain 7, can be actuated by means of an electrical drive 5. In this exemplary embodiment, the lever chain 7 consists of a Bowden cable mount 8 and an actuating lever 9. A drive pawl 10 is arranged pivotably on the actuating lever 9. A leg spring 12 is positioned on a shaft 11 between the actuating lever 9 and the drive pawl 10. The leg spring 12 pre-tensions the drive pawl 10 in the direction of the arrow P.

The locking mechanism 2 is accommodated in a metal lock case 13. For this purpose, the locking mechanism parts 3, 4 are connected to the lock case 13 by means of metallic shafts 14, 15, so that a mounting for the locking mechanism 2 can be realized. At the same time, the actuating lever 9 is pivotably accommodated on the shaft 15 of the pawl 4. Hence, the Bowden cable mount 8, the actuating lever 9 and the drive pawl 10 are mounted in the motor vehicle lock 1 via the shaft 15. The Bowden cable mount 8 and the drive pawl 10 are each pivotably accommodated in the actuating lever 9. For this purpose, the Bowden cable mount 8 is mounted via a shaft 16 and the drive pawl 10 is mounted via the shaft 11 in the actuating lever 9.

The rotary latch 3 is pivotably accommodated in the lock case 13 via the shaft 14. It can be seen that the rotary latch 3 is in a pre-latching position, wherein the pawl 4 rests against a pre-latching surface 17 of the rotary latch 3. A bolt 18 is also arranged on the rotary latch 3 and serves as an engagement surface for the drive pawl 10. The present locking mechanism 2 and, in particular, the rotary latch 3 is with a latching element 19, wherein the latching element serves for realizing the main latch in the motor vehicle lock 1. FIG. 1 shows the pre-latching position of the locking mechanism 2, in which a lock holder 20 can be fixed by means of the rotary latch 3 or the locking mechanism 2. FIG. 1 thus shows the door closed manually, for example, which, however, is open at least by a gap.

Figure 2:
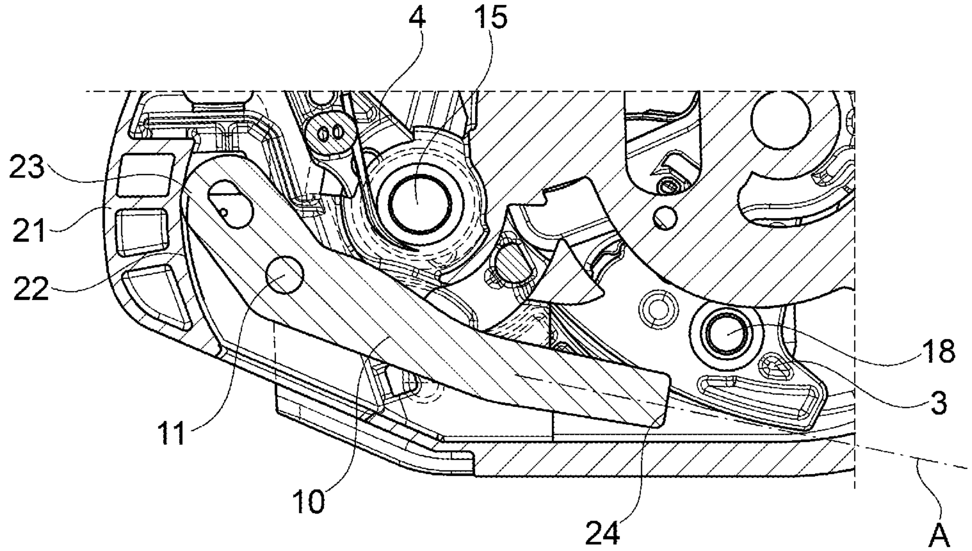
FIG. 2 shows a starting position of the drive pawl of the closing device.

FIG. 2 shows the starting position A of the drive pawl 10. The drive pawl 10 is spring-tensioned in the direction of the arrow P, i.e., counterclockwise about the shaft 11. The drive pawl rests against a housing 21 of the motor vehicle lock 1. The lock housing 21 has a guide portion 22, wherein one end 23 of the drive pawl 10 rests in a spring-tensioned manner against the guide portion 22. FIG. 2 thus shows the non-actuated position of the closing device. In this starting position A, an engagement surface 24 on the drive pawl 10 is spaced apart from the bolt 18 on the rotary latch 3. In cooperation with the leg spring 12, the guide portion 22 keeps the drive pawl 10 out of engagement with the rotary latch 3 or bolt 18. The lock is in the pre-latching position shown in FIG. 1. Now, if the pre-latching position is detected in the motor vehicle lock 1 for example by means of a microswitch, the electrical drive 5 experiences a signal and moves the Bowden cable 6. Movement of the Bowden cable results in the lever chain and, in particular, the actuating lever 9 being pivoted counterclockwise about the shaft 19, so that the drive pawl moves along the arrow P1.

Figure 3:
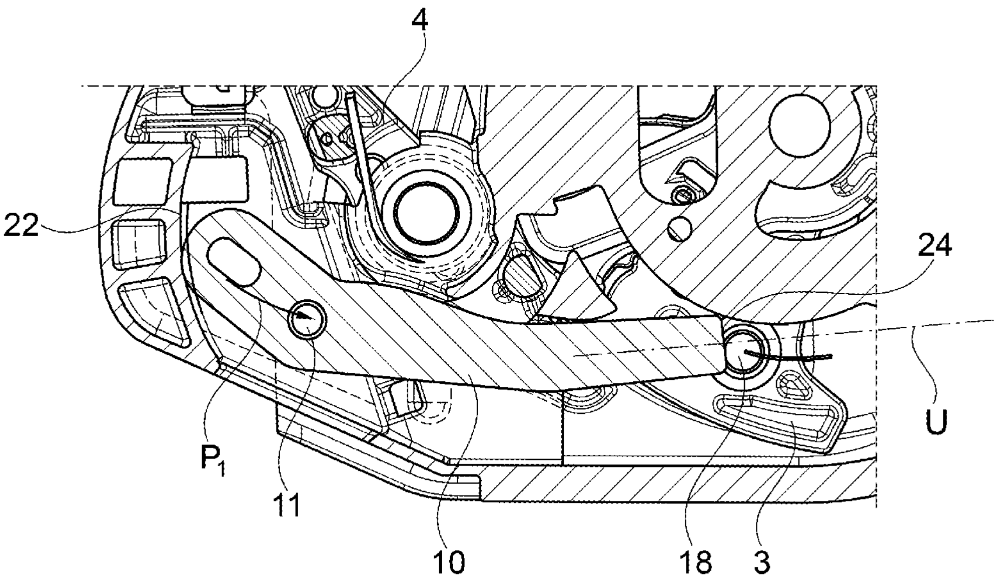
FIG. 3 shows an engagement position of the drive pawl, wherein the drive pawl is depicted in engagement with a rotary latch bolt.

Movement of the shaft 11 along the arrow P1 results in the guide portion 22 enabling a movement of the drive pawl 10, so that the drive pawl pivots about the shaft 11 in the direction of the arrow P. Pivoting of the drive pawl 10 results in the engagement surface 24 engaging with the bolt 18 on the rotary latch 3. As shown in FIG. 3, the drive pawl 10 is now in the engagement position E. The guiding of the drive pawl 10 can be realized with the simplest structural means, as shown in the exemplary embodiment, of a leg spring 12 and a guide contour or a guide portion 22 on the lock housing. A closing device for a motor vehicle lock 1 can thus be provided with the simplest structural means and thus cost-effectively. In this respect, FIG. 3 shows the start of the closing operation.

Now, if an obstacle is detected during the closing operation or if the closing operation is aborted, the drive pawl 10 can, according to the invention, be moved out of engagement with the bolt 18 by a means for separation 25. If, for example, the operator gives the signal for softening the closing operation, the pawl 4 is moved clockwise about the shaft 15, so that the pawl 4 is moved out of the engagement region of the rotary latch 3. At the same time, a separating means 25, here in the form of an extension on the pawl 4, comes into engagement with the drive pawl 10 and moves the drive pawl clockwise about the shaft 11.

The pivoting movement of the drive pawl about the shaft 11, which is brought about by the separating means 25, results in an interruption of the closing operation by the engagement surface 24 of the drive pawl 10 coming out of engagement with the bolt 18 on the rotary latch 3. The rotary latch is hence freely movable by the pawl and the drive pawl and can be freely pivoted about the shaft 14 of the rotary latch 3. The rotary latch can hence be moved into an open position unhindered and under the action of a door sealing pressure and/or a rotary catch spring, for example. The pivotable component held by means of the motor vehicle lock 1 can thus be opened.

Figure 4:
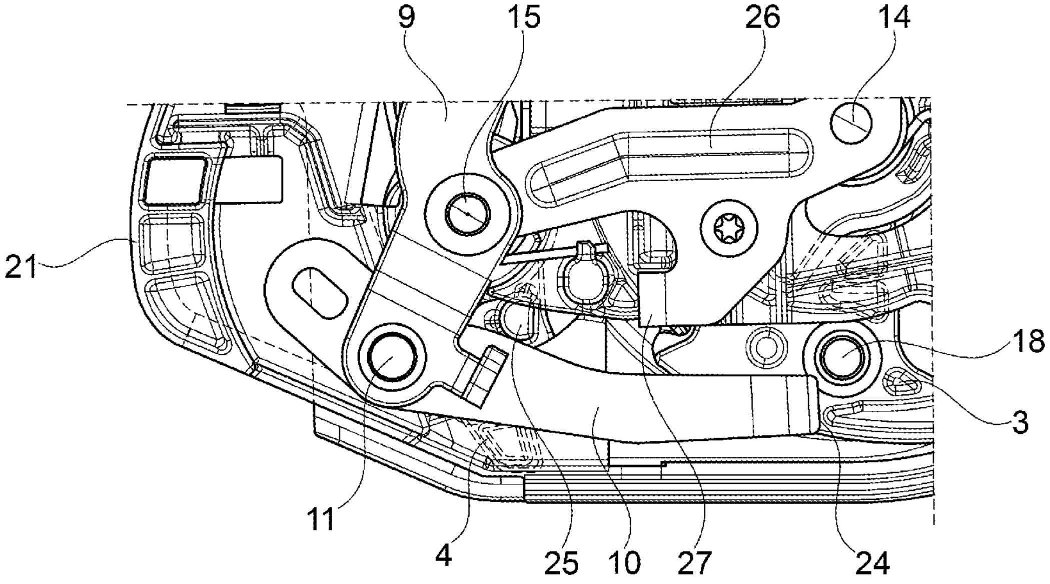
FIG. 4 shows an interruption of a closing operation by means of the pawl.

FIG. 4 additionally shows a reinforcing plate 26 which extends between the shafts 14 and 15 in the motor vehicle lock. An additional arm of the reinforcing plate 26 offers an additional support in the motor vehicle lock housing 21, so that additional stabilization of the motor vehicle lock can be achieved. As a result of the design according to the invention of the motor vehicle lock, a structurally simple closing device equipped with a smallest possible number of components can be provided with a means for interrupting the closing operation.

LIST OF REFERENCE NUMBERS

- 1 Motor vehicle lock
- 2 Locking mechanism
- 3 Rotary latch
- 4 Pawl
- 5 Electrical drive
- 6 Bowden cable
- 7 Lever chain
- 8 Bowden cable mount
- 9 Actuating lever
- 10 Drive pawl
- 11, 14, 15, 16 Axis
- 12 Leg spring
- 13 Lock case
- 17 Supply
- 18 Bolt, engagement surface on the rotary latch
- 19 Ratchet element
- 20 Latch holder
- 21 Lock housing
- 22 Guide portion
- 23 End of the drive pawl
- 24 Engagement surface on the drive pawl
- 25 Separating means
- 26 Reinforcing plate
- P, P1 Arrow
- A Starting position
- E Engagement position

The invention claimed is:

1. A motor vehicle lock comprising:

a locking mechanism having a rotary latch and a pawl as locking mechanism components, a closing device having at least one drive and a lever chain actuated by the drive that operates the locking mechanism components, a drive pawl following the lever chain for driving an associated one of the locking mechanism components, and a means for separating the drive from the locking mechanism components, wherein the means for separating includes one of the locking mechanism components, wherein the drive pawl directly engages with the rotary latch.

2. The motor vehicle lock according to claim 1, wherein the locking mechanism further includes a shaft, and an actuating lever of the lever chain is mounted on the shaft.

3. The motor vehicle lock according to claim 2, further comprising a spring element, wherein the drive pawl is pre-tensioned in a direction of the rotary latch by the spring element acting between the drive pawl and the actuating lever.

4. The motor vehicle lock according to claim 3, wherein the spring is a leg spring having a first leg attached to the actuating lever and a second leg attached to the drive pawl.

5. The motor vehicle lock according to claim 2, wherein the shaft is a pawl shaft of the pawl, and the actuating lever is mounted directly to the pawl shaft.

6. The motor vehicle lock according to claim 2, wherein the drive pawl is pivotably mounted on the actuating lever.

7. The motor vehicle lock according to claim 1, further comprising a housing, wherein the drive pawl is brought into engagement with the housing.

8. The motor vehicle lock according to claim 7, wherein the drive pawl is guided in a direction toward the rotary latch by the housing.

9. The motor vehicle lock according to claim 1, wherein the separating means is arranged on the pawl.

10. The motor vehicle lock according to claim 9, wherein the drive pawl is released from engagement with the rotary latch by a movement of the pawl.

11. The motor vehicle lock according to claim 1, further comprising a reinforcing plate, wherein the pawl includes a pawl shaft and the rotary latch includes a rotary latch shaft, and the pawl shaft and the rotary latch shaft are stabilized by the reinforcing plate.

12. A motor vehicle lock comprising:

a locking mechanism having a rotary latch and a pawl as locking mechanism components, a closing device having at least one drive and a lever chain actuated by the drive that operates the locking mechanism components, a drive pawl following the lever chain for driving an associated one of the locking mechanism components, and a means for separating the drive from the locking mechanism components, wherein the means for separating includes one of the locking mechanism components, wherein the drive pawl is brought into engagement with a bolt arranged on the rotary latch.

13. The motor vehicle lock according to claim 12, wherein the bolt is arranged on a radially outer radius of the rotary latch.

14. The motor vehicle lock according to claim 12, wherein the means for separating separates the drive pawl from the bolt.

15. The motor vehicle lock according to claim 12, wherein the drive pawl is arranged in a plane parallel to the rotary latch, and the bolt extends beyond the plane.

16. A motor vehicle lock comprising:

a locking mechanism having a rotary latch and a pawl as locking mechanism components, a closing device having at least one drive and a lever chain actuated by the drive that operates the locking mechanism components, a drive pawl following the lever chain for driving an associated one of the locking mechanism components, and a means for separating the drive from the locking mechanism components, wherein the means for separating includes one of the locking mechanism components, wherein the locking mechanism further includes a shaft, and an actuating lever of the lever chain is mounted on the shaft, and wherein the shaft is a pawl shaft of the pawl, and the actuating lever is mounted directly to the pawl shaft.

* * * * *